Aug. 25, 1953 H. F. GAVIGAN 2,650,272

TIME CONTROLLED RADIO PROGRAM SELECTOR

Filed Sept. 9, 1947 4 Sheets-Sheet 1

HAROLD. F. GAVIGAN
INVENTOR.

BY [signature]

ATTORNEY

HAROLD F. GAVIGAN
INVENTOR.
BY [signature]
ATTORNEY.

Aug. 25, 1953 H. F. GAVIGAN 2,650,272

TIME CONTROLLED RADIO PROGRAM SELECTOR

Filed Sept. 9, 1947 4 Sheets-Sheet 3

HAROLD F. GAVIGAN
INVENTOR.

BY [signature]

ATTORNEY

TIME CONTROLLED RADIO PROGRAM SELECTOR

Filed Sept. 9, 1947 4 Sheets-Sheet 4

HAROLD F. GAVIGAN
INVENTOR.

BY

ATTORNEY

Patented Aug. 25, 1953 2,650,272

UNITED STATES PATENT OFFICE 2,650,272

TIME CONTROLLED RADIO PROGRAM SELECTOR

Harold F. Gavigan, Malverne, N. Y.

Application September 9, 1947, Serial No. 772,975

9 Claims. (Cl. 200—37)

The present invention relates to a time-controlled radio program selector, which is capable of automatically tuning in preselected radio programs on certain stations at predetermined times.

One of the objects of my invention is to provide a simple, compact mechanism which can be produced at low cost, and mounted on the front of a conventional radio receiver, without increasing the size of the cabinet unduly.

Another object of my invention is to provide an automatic time-controlled tuning mechanism, in which the clock motor serves as the source of power and a dial, graduated in 15 minute intervals is used to control the setting of the station selector.

A further object of my invention is to provide a program selector in which the increased cost of the receiver attendant upon the application of the selector may be reduced to a minimum.

A further object of my invention is to provide a program selector which may be attached to a standard radio receiver without requiring excessive modification of the receiver.

A primary object of my invention is to produce a reliable, inexpensive program selector, which has a minimum of mechanical parts, and can be operated and adjusted, without difficulty by an inexperienced person.

A further object of my invention is to provide a program selector mechanism in which a clock, housed within the selector casing, directly controls the functioning of the various time-controlled parts of the mechanism.

A further object of my invention is to provide a program selector mechanism which is operated at the same speed as the movement of the clock, with the actuating parts angularly positioned around the clock dial so as to eliminate the necessity for complicated gearing and control lever systems.

The accompanying drawings illustrative of one embodiment of my invention, together with the description of the construction and mode of operation will serve to clarify further objects and advantages, and the principles of operation of my invention.

Figure 1:
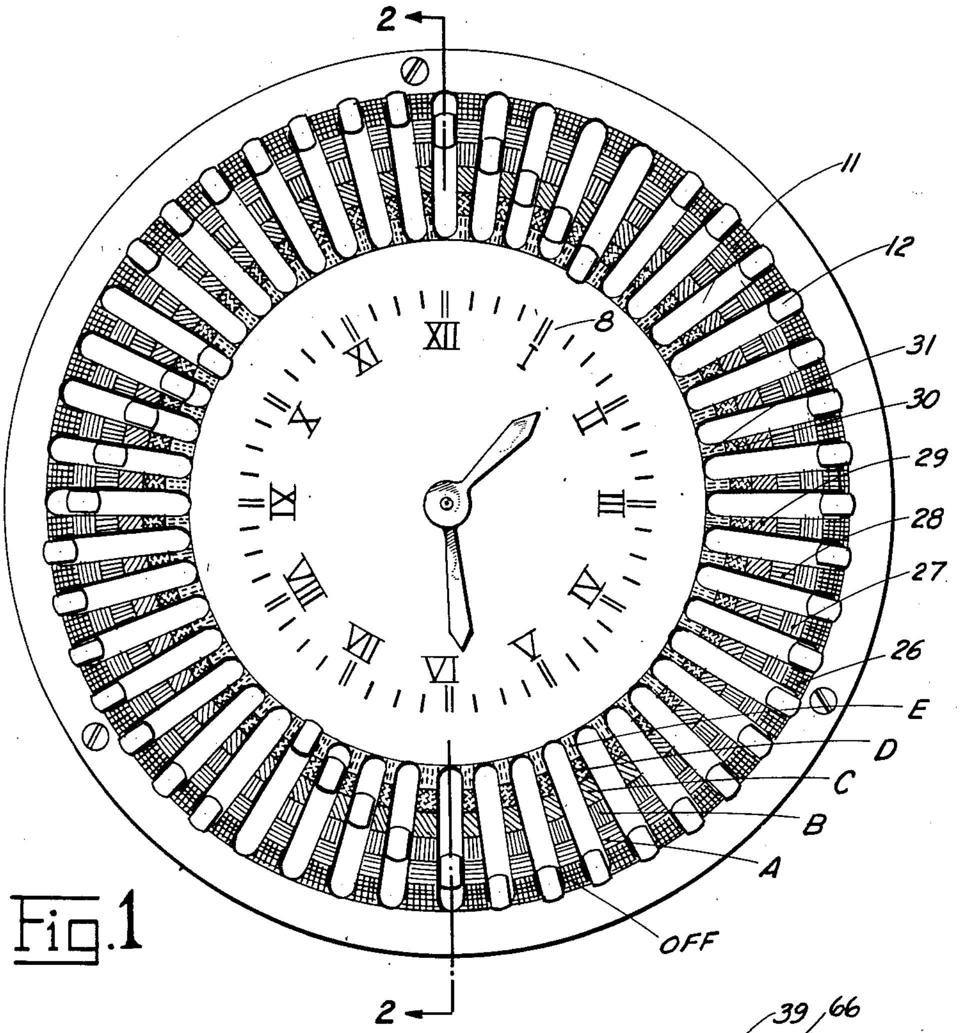
Fig. 1 represents a plan view of the program selector, showing the clock dial and the control knobs in position.
Figures 2, 10:
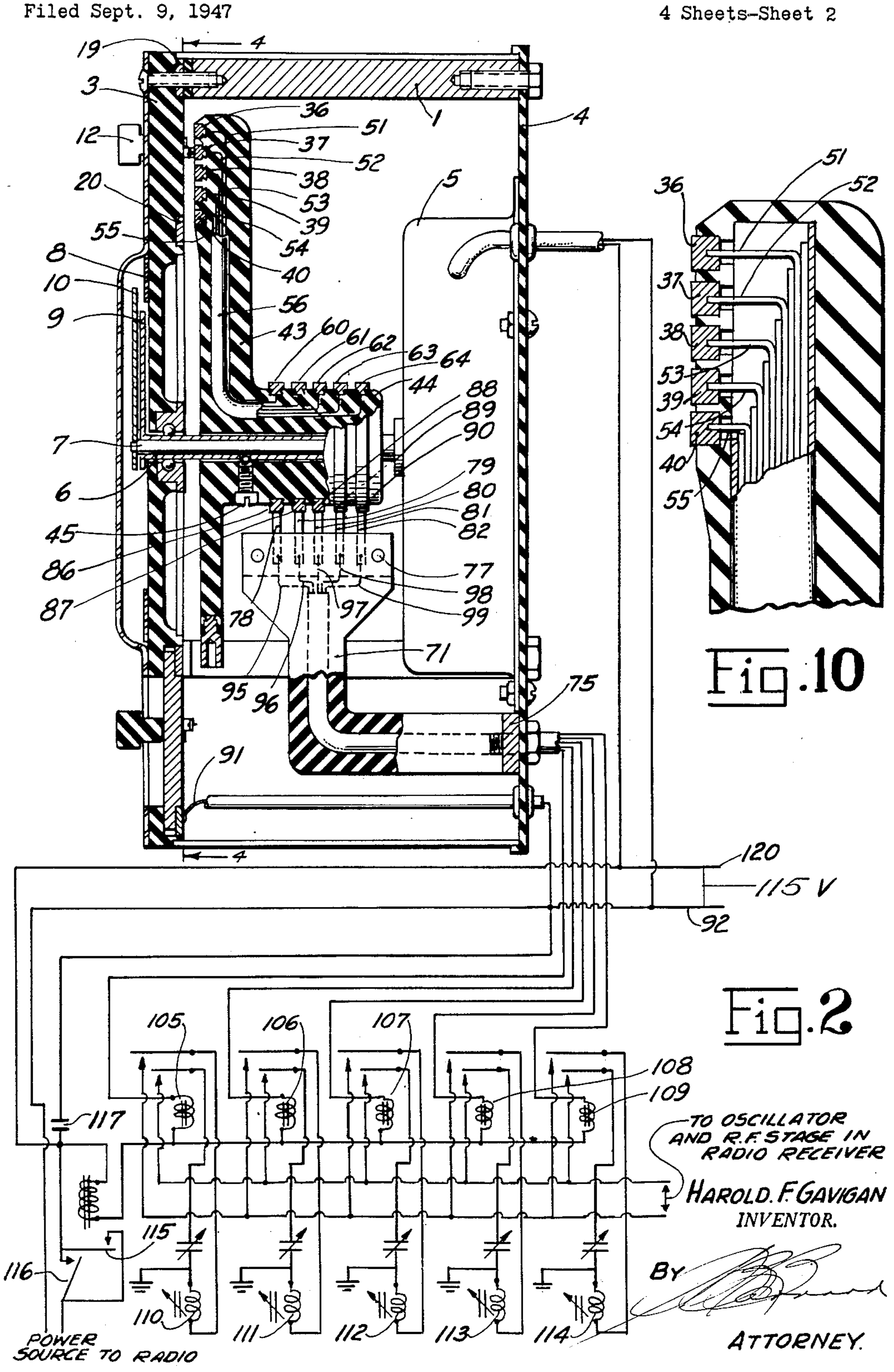
Fig. 2 represents a vertical section taken at 2—2 of Fig. 1, showing the operating mechanism of the program selector, in detail, also the wiring of the unit, and a wiring diagram showing the connections required to the radio receiver on which the unit is mounted.
Fig. 10 represents an enlarged vertical section, similar to that shown in Fig. 1, showing an alternate method of attaching the arcuate contacts to the contact plate.

The operating mechanism of my program selector as shown in Figs. 1 and 2, is contained within a cylindrical housing with a dial plate attached to the top and a lower cover plate attached to the bottom. A clock, which is actuated by a small electric motor, is attached to the center of the bottom plate. The clock shafts, consisting of a solid internal shaft and a tubular external shaft are longer than the conventional shafts and extended upward thru a clock dial mounted on the dial plate, which covers the upper end of the housing.

The dial plate comprises a circular disc moulded of a plastic or similar material with a conventional clock face either attached to the upper surface or engraved in the central portion of the top of the dial plate.

A series of grooves or slots are cut radially around the outside of the plate, between the outer edge of the dial plate and the outer circumference of the clock dial. In the embodiment shown in Fig. 1, these slots are located 7½° apart.

While any desired number of slots may be used, depending upon the total time covered by the clock dial and the program intervals desired, the embodiment shown in Fig. 1 has forty-eight slots, covering a period of 12-hours divided into fifteen minute intervals.

Where a full twenty-four hour period is desired, a clock face covering 24-hours may be utilized, with slots provided at intervals of fifteen or thirty minutes, thus necessitating forty-eight or ninety-six slots, depending upon the range and time intervals desired.

At each of the above slots a sliding knob is provided. This knob is attached to a contact holder bracket which slides along a rectangular or square slide rod, which is fitted into each slot in the dial plate.

In the usual operation six knob positions are provided at each slot, the "off" position being located at the outer edge of the slot, with five station selector positions spaced equidistant radially along the slot.

The number of station positions while shown on the drawings as five may be six or more depending upon the range and number of stations which the program selector is designed to cover.

When it is desired to set the apparatus, each knob is slid radially along the bar to the position desired to tune in a selected program, at the time interval corresponding to the position of the hour hand, on the circumference of the clock dial.

Thus the knob mounted at the top of the dial corresponding to 12 o'clock may be set in the "off" position. The next knob corresponding to 12:15 o'clock could be set at station A, which may be WJZ. The knob corresponding to 12:30 would in turn be slid into the position corresponding with station number B, or WOR. The following knob, which controls the 12:45 program, could be set opposite station C, and the two following knobs controlling the 1:00 and 1:15 programs set at stations D and E, respectively, or any other desired stations, depending upon the selection of programs desired.

Thus to select a full hour of programs, it is necessary to move four knobs to positions opposite the desired stations or to the "off" position for any period within the hour during which no programs are desired.

Where it is desired to set the apparatus for full operation over a period of 12 hours, it is necessary to move 48 knobs into position opposite selected stations, or to leave them in the off-position during periods in which the radio receiver is to be kept off.

Each knob consists of a knob proper which may be made of a moulded plastic material, at the sides of which the arms of a slider bracket are either attached, or the upper ends of the bracket arms may be moulded into the lower portion of the knob. The slider bracket is accurately slidably fitted over a slide bar of rectangular or square cross-section, which is supported in the center of each radial slot in the dial plate.

A series of countersinks or grooves, the locations of which depend upon the total number and position of the station selector locations on the dial slots plus the off-position, are cut in each bar. A spring-controlled contact button is attached to the bottom of each knob support bracket to establish electrical contact with the proper contact sector in a sector plate attached to the outer clock shaft when the selected knob corresponding to the time required is moved into the desired radial position to tune in a selected station.

A relay switch is provided in the radio receiver to automatically turn on the radio receiver proper, when the manual switch is open.

In normal operation the current from one leg of an electrical power source passes thru a lead wire to a pair of contact rings attached to the bottom of the dial plate, thence to the slide bars, the ends of which engage the contact ring. When a knob is slid along the slide bar to one of the operative positions, the current from the contact ring passes thru the slide bar thence thru the contact holder to the contact button from which it goes to one of the contact sector bands. From the contact sector band in the contact sector plate, it is carried by means of a lead wire to one of the slip rings attached to the hub of the contact sector holder. One of a series of brushes in slidable contact with each slip ring carries the current from the slip ring through the selected tuned circuit in the radio receiver. From the solenoid the current passes through a relay switch which automatically switches the radio on, then to the other leg of the main power source thereby completing the electrical circuit.

When the slider knob is moved to the off-position in the slot, the main solenoid is disconnected, thus shutting the receiver off during the time period controlled by the particular knob.

During periods when manual operation of the receiver is preferred, a manual switch is provided to turn the receiver on and manually select programs.

It will be understood that the foregoing general description and the following detailed description as well, are intended as explanatory of the invention and are not restrictive thereof.

In the drawings, the same reference numerals designate the same parts thruout the various views.

As indicated in Figures 1 and 2, the program selector unit is mounted in a substantially cylindrical casing 1, to which are attached two plates, an upper or dial plate 3, and a lower or cover plate 4. A clock 5 which is driven by a small motor mounted in the clock housing is attached to the center of the cover plate 4 at the lower end of the casing.

Two shafts, an auxiliary tubular shaft 6 and a solid clock shaft 7, extend from the top of the clock motor casing thru the center of the dial plate 3 at the top of the selector casing, a clock dial 8 of the conventional type is attached to the center of the plate 3, or engraved on the face of the plate. The conventional type of hour hand 9 is attached to the outer tubular clock shaft 6, and a minute hand 10 attached to the solid clock motor shaft 7, to indicate the time on the face of the clock dial 8 in the usual manner. A series of rectangular slots 11, the ends of which may be rounded, when a circular, oval shaped or rectangular knob with the ends rounded is used are cut radially in the dial plate, between the outer edge of the clock dial for a distance short of the outer circumference of the dial plate.

Where a twelve-hour clock of the conventional type is used, and the apparatus is designed to tune in the radio receiver at intervals of fifteen minutes, there are 48 slots 11 placed equi-distant angularly around the circumference of the dial plate.

A control knob 12 is mounted in the center of each slot. As indicated in Figures 8 and 9 a substantially U-shaped contact holder 13 consisting of a substantially flat bottom and two vertical sides, the upper ends of which are moulded into or otherwise attached to the bottom of the control knob 12, are slidably fitted over a slide bar 15 of rectangular, square or other polygonal cross-section.

Figure 6:
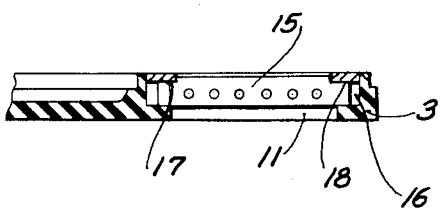
Fig. 6 is a section taken at 6—6 of Fig. 4, showing the method of supporting the slide bars, in the dial plate.
Figures 3, 4:
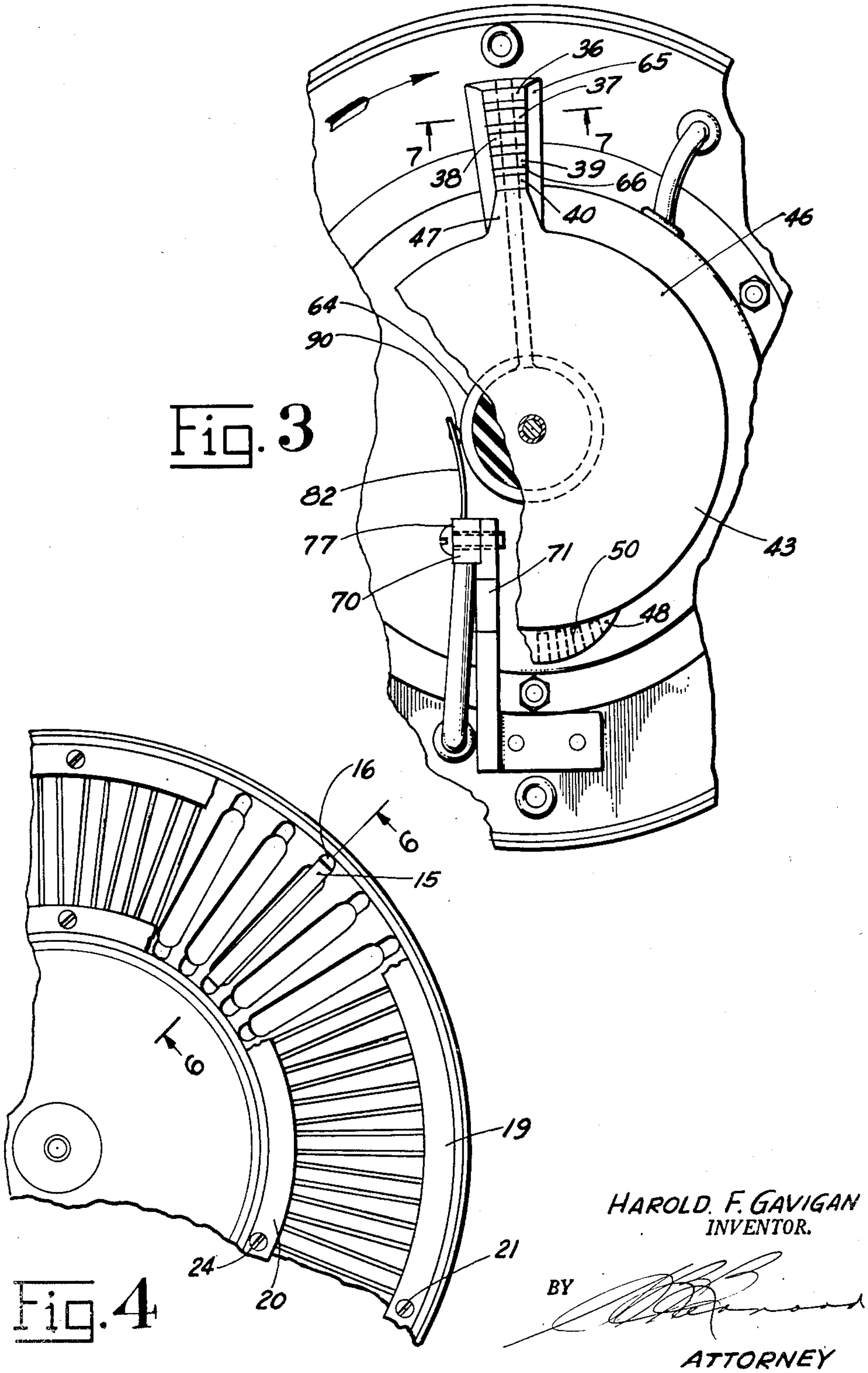
Fig. 3 represents a plan view of the program selector, with the dial plate removed, showing the sector plate, contact sectors, slip rings and contact mechanism as well as the brush and brush holder construction.
Fig. 4 represents a bottom view of the dial plate taken at 4—4, Fig. 2, showing the dial plate construction and the method of supporting the slide bars, and contact rings in the dial plate.

As indicated in Figures 4 and 6 the slide bars 15 fit into countersinks 16 cut in the lower portion of the dial plate 3. The ends of the slide bars are cut down to form ledges at 17 and 18 to provide room for two contact rings 19 and 20. The outer contact ring 19, which is attached to the bottom of the dial plate by a series of screws 21, rivets, or other suitable means of attachment, hold the outer edges of the slide bars in position.

The inner contact ring 20, which is attached to the lower surface of the dial plate by means of screws 24, holds the inner ends of the slide bars in position. The total number of bars is equal to the number of slots in the dial plate, or 48 for a 12-hour clock with selector controls operative at fifteen minute intervals.

Figures 5, 8, 9:
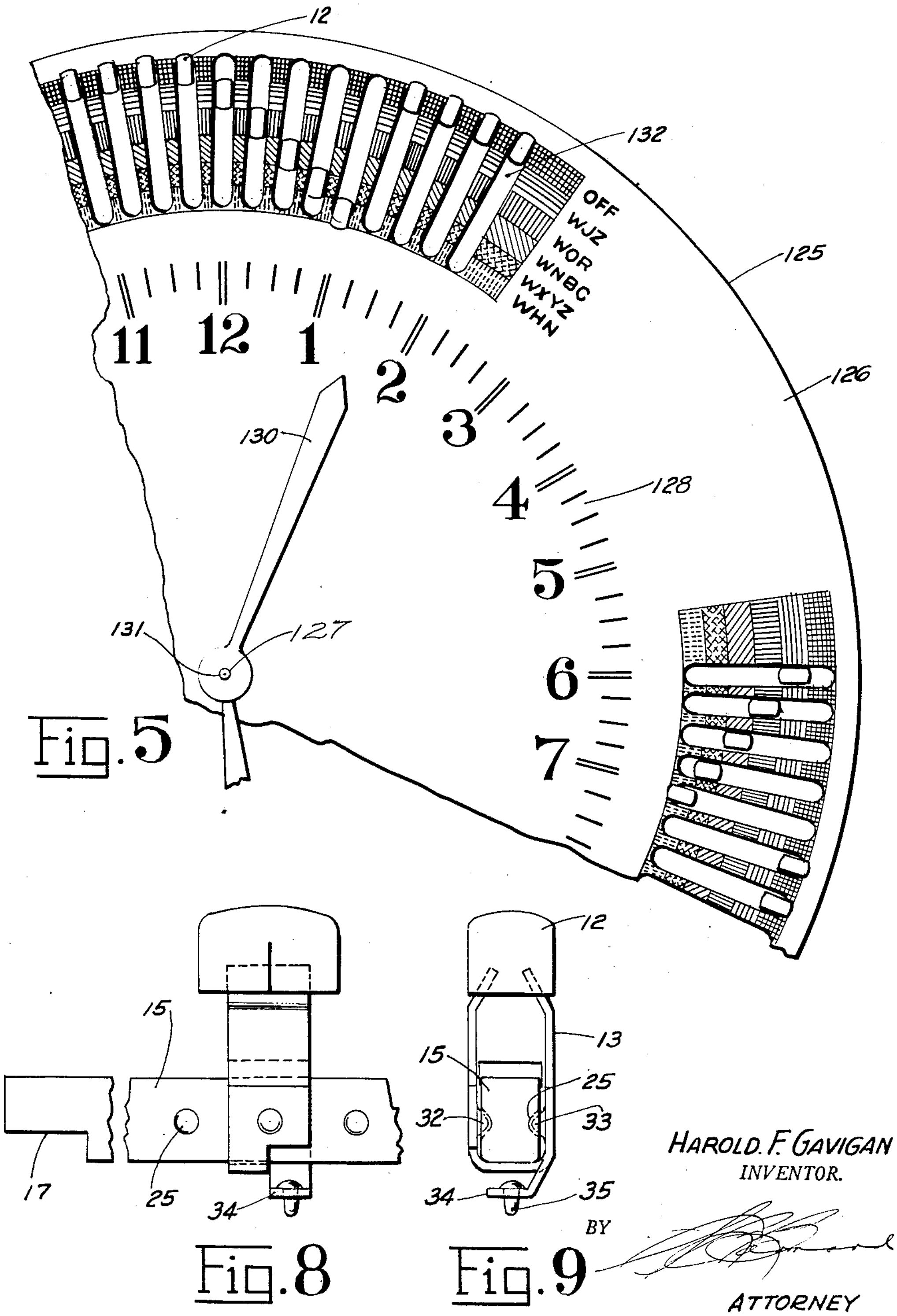
Fig. 5 represents a plan view of the dial plate similar to the one shown in Fig. 1, showing a modified construction in which a 24-hour clock is utilized in place of the conventional 12-hour clock, shown in Fig. 1.
Fig. 8 represents a side view taken at 8—8 of Fig. 1, showing the control knob in position on the slide bar, also the method of attaching the contact to the control knob.
Fig. 9 is an end view of the control knob and slide bar of Fig. 8, showing the method of guiding and locating the control knob and contact bracket on the slide bar.

The slide bars 15, shown in enlarged views in Figs. 8 and 9 are of rectangular cross-section, although square or round bars may be utilized, if preferred.

As indicated in Fig. 8, a series of equally spaced undercuts or countersinks 25 are cut on both sides of each slide bar 15, the number of undercuts in each bar depending upon the number of stations for which the selector unit is designed, plus the "off" position or six positions in the unit shown in Fig. 1. In the dial plate slots shown in Fig. 1, there are five selector stations positions A, B, C, D, and E, at each slot plus an "off" position at the outer limit of the control knob travel. These station positions are indicated by a series of colored bands 26, 27, 28, 29, 30, and 31, located in the angular space between adjacent slots.

As indicated in Figs. 8 and 9 a contact holder 13 the upper ends of which are either molded into the knob 12 or otherwise attached thereto, with the sides slidably fitted over the sides of the slide bar 15. The lower ends of the contact holder 13 straddle the slide bar 15, thus enabling the knob to be moved radially along the slide bar within the limitations of the length of the slots 11. At the positions corresponding with the locations of the countersinks 25, the material of the contact holder sides is punched inward toward the slide bar at the points 32, and 33 respectively, to form two shallow conical tips one in each vertical side, the tips fitting into the countersinks 25 formed in the slide bar, when the control knob 12 is moved along the slide bar 15, the spring tension of the material in the contact holder 13 holding the control knob at the selected station position, such as A, Fig. 1.

A portion of the bottom of the contact arm 13 is extended downward to form a ledge 34 at the bottom of the contact arm. A contact 35 made in the form of a cone with a rounded tip, a hemispherical tip or one of any other suitable cross-section, is attached to the ledge 34, on the contact arm 13, by riveting, spot welding or by any other suitable means known to the art. The spring tension in the contact arm ledge 34 presses the contact 35 against one of a series of sector contact bands 36, 37, 38, 39, and 40, the details of which will be described hereinafter.

As indicated in Figs. 2 and 3, a molded sector plate 43, which is attached by means of an integral hub 44 to the outer tubular clock shaft 6, driven by the clock motor is mounted below the dial plate 3. The hub is locked in position on the tubular shaft by means of a lock screw 45. This sector plate consists of a central disc 46 and an extension arm 47, which is formed integral with the plate at one side thereof. A counterweight 48 is attached to the disc 46 at a point diametrically opposite the extension arm 47. The counterweight may be of lead or other suitable material, and may be attached to the plate by bolting, riveting or by any other suitable method.

A series of slots or holes 50 may be formed in the counterweight 48 to balance the sector plate 43, when the unit is assembled. A series of contact sector bands 36, 37, 38, 39, and 40, made of brass or other suitable material are either moulded into the outer extension arm of the sector plate as indicated in Fig. 2 or attached to the arm by other suitable means as indicated in Fig. 10. These contact sector bands are made in the form of arcuate circular bands with the ends cut off to form an angle slightly less than the angle formed between the adjacent slots 11 in the dial plate.

A series of lead wires 51, 52, 53, 54, and 55, one end of each of which is attached to one of the contact selector bands is mounted in an opening in the arm of the contact sector plate or moulded into the plate. From the sector plates these wires pass thru a cable 56 to the hub of the sector plate. The opposite ends of the wires 51, 52, 53, 54, and 55 are connected to a series of slip rings 60, 61, 62, 63, and 64, which are attached to the hub of the sector plate or moulded into the hub, as indicated in Fig. 2.

Figure 7:
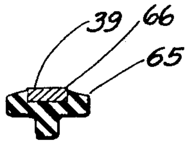
Fig. 7 represents a section taken at 7—7 of Fig. 3, showing the method of supporting the contact sector in the sector plate, and the ramp for raising the contact to the level of the contact sector.

In the drawings, Fig. 3, the forward edges of the contact sector bands are in a position corresponding to the top center position of the dial plate 3, or 12:00 o'clock on the hour hand of the clock. When the sector plate rotates clockwise with the clockshaft, the contact 35 rides up on one side of a ramp or bevel 65 which is formed at the side of the extension arm 47, as indicated in Fig. 7, until the contact 35 engages the forward edge 66 of the contact sector 39.

Around the circumference of the hub 44 of the contact sector plate, a series of slip rings 60, 61, 62, 63, and 64, corresponding to the number of contact sector bands, mounted on the contact sector arm, are made in the form of brass rings and either pressed on or otherwise attached to the hub or moulded into the hub of the sector plate, as indicated in Fig. 2.

A brush holder 70 is attached by means of a bracket 71, to the lower plate 4 which is attached to the casing 1. The brush holder bracket is made in the form of a substantially right angle plate bracket, extending from a flange 75 formed integral with the button of the bracket and attached to the lower plate 4 by means of bolts, rivets or other suitable means. A brush holder 70 is attached to the upper end of the bracket 71 by means of rivets or screws 77 or other suitable means. A series of brush arms 78, 79, 80, 81, and 82, may be moulded into the brush holder 70 or otherwise attached to it by any suitable means.

A series of brushes 86, 87, 88, 89, and 90 are attached to the brush arms 78 through 82 by any suitable means. The brushes 86 thru 90 are in continuous contact with the slip rings 60 thru 64, while the sector plate is rotated with the clock shaft.

When the forward edge 66 of the contact sector band 39 engages the contact button 35 at the bottom of the contact arm 13, the electric circuit is completed.

The electric current passes thru the lead wire 91, which connects the contact rings 19 and 20 which are attached to the bottom of the dial plate 3 to one leg 92 of the power source. From the contact rings 19 and 20 the current passes thru the slide bars 15 to the contact arm 13 attached to the control knob, thence thru the contact 35 attached to the contact arm, to the contact sector band 39 against which the contact 35 is pressed. The current then passes thru a lead wire 54 to the slip ring 63 from which it continues thru the brush 89.

A series of lead wires 51, 52, 53, 54, and 55 are located in a conduit 56 in the sector plate, one end of each of these wires 51 thru 55 being attached to a corresponding contact sector band 36, 37, 38, 39, and 40 and the other end to the corresponding slip ring 60, 61, 62, 63, 64 attached to the hub of the contact sector plate.

The brushes 86 to 90 are connetced by a series of wires 95, 96, 97, 98, and 99 to a series of solenoid coils 105, 106, 107, 108, and 109, mounted in the receiver cabinet. When one of the solenoid coils 105 thru 109 is energized, it automatically switches on one of the selected tuned circuits 110, 111, 112, 113, and 114 in the radio receiver.

From the solenoid the current passes thru a relay switch 115, which automatically switches on the radio receiver. From the relay switch the current returns to the other leg 120 of the main power source thereby completing the electrical circuit.

A manual switch 116 is provided to turn on the radio receiver when automatic operation is not wanted.

When the manual switch 116 is open, a relay switch 115 is provided to automatically switch on the radio receiver, when any of the control knobs is moved to any of the operative on-positions on the dial plate.

A capacitor 117 is connected between the manual switch 115 and the outer contact ring 19 to short cut the back E. M. F. or self-induction.

Fig. 5 shows a modified form of program selector in which a 24-hour clock is used in place of the twelve-hour clock of Fig. 1.

In all other respects, the construction is substantially the same as that shown in Figs. 1 and 2. The unit is mounted in a larger cylindrical casing 125, to which are attached an upper dial plate 126 and a lower cover plate. A 24-hour clock 127 driven by a small motor mounted in the clock housing is attached to the lower cover plate of the housing.

The clock dial 128, shown at the center of the dial plate in Fig. 5, is graduated to cover a full 24-hour period. The figures may run from 1 to 12 a. m. and 1 to 12 p. m. as indicated in Fig. 5, or from 1 to 24, in accordance with standard Navy practice.

The clock shafts are identical with those shown in Figs. 1 and 2 with the hour hand 130 attached to an outer tubular shaft 131.

A series of slots 132 the ends of which are shown rounded are cut radially in the dial plate 126 between the outer circumference of the clock dial, to a point a short distance from the outer edge of the dial plate.

Where the apparatus is designed to tune in the radio receiver at intervals of 15 minutes, there are a total of 96 slots placed equidistant angularly around the circumference of the dial plate, if the entire 24-hour period is covered.

Where it is desired to shut off the receiver during part of the 24-hour period, as between the hours of 2 a. m. and 6 a. m. the slots are omitted during that period.

The same control knob 12 is mounted in the center of each slot as is shown in Fig. 1, with one "off" position at the outer edge of the slots 132 and five operating station positions located progressively along the slots. The positions may be identical by letters, numbers, symbols, characters or colors of any suitable type.

In the plate shown in Fig. 5, the angular space between the adjacent slots and a wider space at 2 a. m. and 6 a. m. are divided into six equally spaced bands or sectors. The outer band, colored black is the "off" position of the knob. The inner band near the outer circumference of the clock dial may be colored purple and represent station WHN. The four intermediate bands, may be colored in any type of contrasting color or otherwise identified to represent any four other selected stations.

The balance of the apparatus and the functioning thereof is identical with that shown in Figs. 1 and 2 and previously described.

The electrical parts of the apparatus, the wiring and the functioning of the various units thereof is the same as that shown in Fig. 2, and hereinbefore described.

Having thus described several embodiments of my invention, I do not wish to be limited thereby.

What I claim is:

1. A program apparatus for a radio receiver comprising a clock, a shaft extending rotatably upward from said clock, a plate rotatably supporting the free end of said clock shaft, said plate having a series of slots cut therein, a contact ring, attached to said plate, a plurality of slide bars, each of said slide bars having a plurality of equally spaced depressions of arcuate contour formed therein mounted on said plate, said slide bars touching said contact ring, a contact button attached to a support slidably mounted on each of said slide bars, each of said contact buttons being manually slidable, along the corresponding slide bar, said support comprising a U-shaped member, each arm of said member having a projection formed therein, said projections selectively fitting into the corresponding depression in the slide bar, to positively locate the support relative to the slide bar, a contact plate attached to said clock shaft and rotating therewith, a plurality of arcuate contacts attached to said contact plate, said arcuate contacts being adapted to slidably and directly engage one of said contact buttons during a portion of each revolution of said contact plate, a program actuating mechanism mounted within said receiver, a plurality of slip rings attached to said contact plate, the number of said slip rings being substantially equal to the number of said arcuate contacts, and a plurality of brushes slidably engaging said slip rings to transmit electrical impulses from said contact ring to said program actuating mechanism when said contact button engages said arcuate contact.

2. A device for selecting programs in a radio receiver comprising a clock, a shaft extending rotatably upward from said clock, a plate rotatably supporting the free end of said clock shaft, said plate having a series of substantially radial slots cut therein, a pair of contact rings attached to said plate, said contact rings supporting a multiplicity of slide bars mounted within the slots in said plate, each of said slide bars having a plurality of equally-spaced cupped depressions formed in the sides thereof, a control knob slidably mounted on each of said slide bars, a contact attached to each of said control knobs, each of said knobs being manually slidable along the corresponding slide bar, a substantially U-shaped contact holder supporting each of said control knobs, each arm of said holder having a projection formed thereon, said projections selectively fitting into the corresponding depressions formed in the slide bar, to positively locate the contact holder relative to the slide bar, a contact plate attached to said clock shaft and rotating therewith, a series of arcuate contacts molded into said contact plate, said arcuate contacts being adapted to directly slidably engage one of said contacts during a portion of a revolution of said contact plate, a program actuating mechanism mounted in said receiver and means for transmitting electrical impulses from a power source thru said control knob contact to said actuating mechanism to selectively initiate a program within said receiver and keep said program on while said control knob contact engages said arcuate contact.

3. A device for selecting programs in a radio receiver comprising a clock, a shaft rotatably attached to said clock, a plate rotatably supporting the free end of said clock shaft, a pair of contact rings attached to said plate, said rings supporting a multiplicity of slide bars mounted on said plate, each of said slide bars having a plurality of equally-spaced cupped depressions formed in the sides thereof, a control knob slidably mounted on each of said slide bars, a contact button attached to each of said control knobs, each of said knobs being manually slidable along the corresponding slide bar, a substantially U-shaped contact holder supporting each of said control knobs, each arm of said holder having a projection formed thereon, said projections selectively fitting into the corresponding depressions formed in the slide bar to positively locate the contact holder relative to the slide bar, a contact plate attached to said clock shaft and rotating therewith, a series of arcuate contacts molded into said contact plate, said arcuate contacts being adapted to directly slidably engage one of said contact buttons during a portion of each revolution of said contact plate, a series of slip rings attached to said contact plate, the number of said slip rings being substantially equal to the number of said arcuate contacts, a program actuating mechanism mounted in said receiver, a series of brushes slidably engaging said slip rings to transmit electrical impulses from said contact ring to said program actuating mechanism while said contact button engages one of said arcuate contacts.

4. A device for selecting programs in a radio receiver comprising a clock, a shaft rotatably attached to said clock, a plate rotatably supporting the free end of said clock shaft, a contact mechanism attached to said plate, a multiplicity of slide bars mounted in said plate adjoining said contact mechanism, each of said slide bars having a plurality of equally-spaced cupped depressions formed in the sides thereof, a control knob slidably mounted on each of said slide bars, a contact button attached to each of said control knobs, each of said knobs being manually slidable along the corresponding slide bar, a substantially U-shaped contact holder supporting each control knob and the corresponding contact button, each arm of said holder having a projection formed thereon, said projections selectively fitting into the corresponding depressions formed in the slide bar to positively locate the contact holder relative to the slide bar, a contact plate attached to said clock shaft and rotating therewith, a plurality of arcuate contacts molded into said contact plate, each of said arcuate contacts being adapted to progressively directly engage selected contact buttons during a portion of each revolution of said contact plate, a program actuating mechanism mounted in said receiver and means for transmitting electrical impulses from a power source thru said contact mechanism to said program actuating mechanism when the control knob contact button engages the selected arcuate contact to selectively initiate a program within said receiver and keep said program on while the control knob contact button engages the selected arcuate contact.

5. A program selector apparatus comprising a motor-driven clock, a shaft rotatably attached to said clock, a plate rotatably supporting the free end of said clock shaft, said plate having a series of substantially radial slots cut therein, a pair of contact rings attached to said plate, a series of slide bars mounted within the slots in said plate, the ends of said bars touching said contact rings, each of said slide bars having a plurality of equally-spaced cupped depressions formed therein, a bracket slidably mounted on each of said slide bars, a control knob attached to each of said brackets, a contact button attached to the opposite end of each of said brackets, each of said knobs being manually slidable along the corresponding slide bar, each of said brackets having a pair of projections formed thereon, said projections selectively fitting into the corresponding depressions formed in the slide bar, to positively locate the bracket relative to the slide bar, a contact plate attached to the shaft of said clock and rotating therewith, a series of arcuate contacts molded into said contact plate, said arcuate contacts being adapted to directly and selectively engage one of said contact buttons during a portion of each revolution of said contact plate, a series of slip rings attached to said contact plate, the number of said slip rings being substantially equal to the number of said arcuate contacts, a program actuating mechanism mounted in a radio receiver, and means for selectively transmitting electrical impulses from said contact rings thru one of said slip rings while said contact button engages one of said arcuate contacts in said contact plate.

6. A program selector apparatus comprising a motor-driven clock, a shaft rotatably attached to said clock, a plate rotatably supporting the free end of said clock shaft, said plate having a series of substantially radial slots cut therein, a pair of contact rings attached to said plate adjacent said contact rings, a series of slide bars mounted within the slots in said plate, the ends of said bars touching said contact rings, each of said slide bars having a plurality of equally-spaced cupped depressions formed therein, a bracket slidably mounted on each of said slide bars, a control knob attached to each of said brackets, a contact button attached to the opposite end of each of said brackets, each of said knobs being manually slidable along the corresponding slide bar, each of said brackets having a pair of projections formed thereon, said projections selectively fitting into the corresponding depressions formed in the slide bar, to positively locate the bracket relative to the slide bar, a contact disc attached to the shaft of said clock and rotating therewith, a series of arcuate contacts molded into said contact disc, said arcuate contacts being adapted to directly and progressively engage said contact buttons during a portion of each revolution of said contact plate, a program actuating mechanism mounted in a radio receiver, a plurality of slip rings attached to said contact disc, the number of said slip rings being substantially equal to the number of said arcuate contacts, a plurality of brushes slidably engaging said slip rings to transmit electrical impulses from a power source thru said contact rings to said program actuating mechanism while one of said contact buttons engage one of said arcuate contacts.

7. Control mechanism for a radio receive comprising a motor-driven clock having an hour and minute hand, a rotatable tubular shaft extending upward from said clock, a plate rotatably supporting the free end of said clock shaft, said plate having a series of substantially radial slots cut therein, contact rings attached to said plate, a series of slide bars mounted within the slots in said plate, said bars adjoining said contact rings, said slide bars having a series of cupped depressions cut therein, a bracket slidably mounted on each of said slide bars, a control knob attached to each of said brackets, a tip extending from each of said brackets, said tips fitting one set of depressions in said slide bar to locate said bracket on said slide bar, a contact button depending from each of said brackets, each of said knobs being manually slidable along the corresponding slide bar, a program actuating mechanism mounted within said said receiver, said control mechanism functioning independently of the hands of said clock, and means for selectively transmitting power impulses from a power source thru said contact button and contact plate to said program actuating mechanism.

8. The combination with a radio receiver having a plurality of mechanisms operable each to render the receiver selective to a predetermined station, of a time-clock controlled mechanism for automatically tuning in said stations at predetermined times, comprising a motor-driven clock having an hour and minute hand, a shaft rotatably extending from said clock, a plate rotatably supporting one end of the shaft of said clock, contact rings attached to said plate, a plurality of slide bars mounted on said plate adjoining said contact rings, each of said slide bars having a plurality of equally-spaced cupped depressions formed therein, a control knob slidably mounted on each of said slide bars, a contact button attached to each of said control knobs, each of said knobs being manually slidable along the corresponding slide bar, a substantially U-shaped contact holder supporting each control knob and the corresponding contact button, each arm of said holder having a projection formed thereon, said projections selectively fitting into the corresponding depressions formed in the slide bar to positively locate the contact holder relative to the slide bar, a contact plate attached to the shaft of said clock and rotating therewith, a plurality of arcuate contacts molded into said contact plate, each of said arcuate contacts being adapted to directly and slidably engage one of said contact buttons during a portion of a revolution of said clock shaft, a program actuating mechanism mounted within said receiver, said mechanism functioning independently of the hands of said clock, and means for selectively transmitting power impulses from said contact plate thru said arcuate contact to said program actuating mechanism while said contact button engages said arcuate contact.

9. The combination with a radio receiver having a plurality of mechanisms operable each to render the receiver selective to a predetermined station, of time-clock controlled mechanism for automatically tuning in said stations at predetermined times, comprising a motor-driven clock, a shaft rotatably extending from said clock, a plate rotatably supporting the free end of said clock shaft, contact rings attached to said plate, a plurality of slide bars mounted on said plate adjoining said contact rings, each of said slide bars having a plurality of equally-spaced cupped depressions formed therein, a control knob slidably mounted on each of said slide bars, a contact button attached to each of said control knobs, each of said knobs being manually slidable along the corresponding slide bar, a substantially U-shaped contact holder supporting each control knob and the corresponding contact button, each arm of said holder having a projection formed thereon, said projections selectively fitting into the corresponding depressions formed in the slide bar to positively locate the contact holder relative to the slide bar, a contact plate attached to the shaft of said clock and rotating therewith, a plurality of arcuate contacts molded into said contact plate each of said arcuate contacts being adapted to directly slidably engage one of said contact buttons during a portion of a revolution of said clock shaft, a plurality of slip rings attached to said contact plate, the number of said slip rings being substantially equal to the number of said arcuate contacts, a program actuating mechanism mounted in said receiver and means for selectively transmitting electrical impulses from said slip rings to said program actuating mechanism while said contact button engages said arcuate contact.

HAROLD F. GAVIGAN.

References Cited in the file of this patent

UNITED STATES PATENTS

| Number | Name | Date |
|---|---|---|
| 1,972,921 | Dodds | Sept. 11, 1934 |
| 2,061,504 | Christie | Nov. 17, 1936 |
| 2,070,779 | Bowen et al. | Feb. 16, 1937 |
| 2,075,257 | Zadig | Mar. 30, 1937 |
| 2,154,437 | Colton | Apr. 18, 1939 |
| 2,172,492 | Barrie | Sept. 12, 1939 |
| 2,175,561 | Fritz | Oct. 10, 1939 |
| 2,275,650 | Porter et al. | Mar. 10, 1942 |
| 2,311,649 | Elliott | Feb. 23, 1943 |